(12) United States Patent
Guen

(10) Patent No.: US 8,852,793 B2
(45) Date of Patent: Oct. 7, 2014

(54) SECONDARY BATTERY

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 288 days.

(21) Appl. No.: 13/082,268

(22) Filed: Apr. 7, 2011

(65) Prior Publication Data

US 2012/0171525 A1 Jul. 5, 2012

(30) Foreign Application Priority Data

Dec. 29, 2010 (KR) .................. 10-2010-0137729

(51) Int. Cl.
*H01M 2/00* (2006.01)
*H01M 2/02* (2006.01)
*H01M 10/04* (2006.01)

(52) U.S. Cl.
CPC ........ *H01M 2/0277* (2013.01); *H01M 10/0436* (2013.01); *H01M 2/0275* (2013.01); *Y02E 60/12* (2013.01)
USPC ........... 429/163; 429/186; 429/208; 429/176; 429/175; 429/53

(58) Field of Classification Search
None
See application file for complete search history.

(56) References Cited

U.S. PATENT DOCUMENTS

| | | | |
|---|---|---|---|
| 5,585,206 A * | 12/1996 | Morris | 429/161 |
| 6,004,692 A | 12/1999 | Muffoletto et al. | |
| 2010/0136415 A1 | 6/2010 | Ahn et al. | |
| 2010/0203373 A1 | 8/2010 | Kawase et al. | |
| 2011/0086265 A1 * | 4/2011 | Suzuki | 429/186 |
| 2012/0003512 A1 * | 1/2012 | Kohno et al. | 429/53 |

FOREIGN PATENT DOCUMENTS

| | | |
|---|---|---|
| JP | 2009-170137 A | 7/2009 |
| KR | 10-2006-0022355 A | 3/2006 |
| KR | 2010-0222533 A | 3/2010 |
| KR | 2010-0060980 A | 6/2010 |

* cited by examiner

*Primary Examiner* — Milton I Cano
*Assistant Examiner* — Carmen Lyles-Irving
(74) *Attorney, Agent, or Firm* — Christie, Parker & Hale, LLP

(57) ABSTRACT

A secondary battery includes an electrode assembly including a first electrode plate including a first non-coating portion, a second electrode plate including a second non-coating portion, and a separator between the first and second electrode plates; an insulating bag accommodating the electrode assembly and including first and second connection members electrically connected to the first and second non-coating portions, respectively; a case accommodating the electrode assembly and the insulating bag; a cap plate sealing an opening of the case; and first and second electrode terminals electrically connected to the first and second connection members, respectively. An upper part of the insulating bag having an opening is coupled to a lower surface of the cap plate.

16 Claims, 6 Drawing Sheets

SECONDARY BATTERY

CROSS-REFERENCE TO RELATED APPLICATION

This application claims priority to and the benefit of Korean Patent Application No. 10-2010-0137729, filed in the Korean Intellectual Property Office on Dec. 29, 2010, the entire content of which is incorporated herein by reference.

BACKGROUND

1. Field

Aspects of embodiments of the present invention relate to a secondary battery.

2. Description of the Related Art

Secondary batteries are rechargeable, unlike primary batteries. Among such secondary batteries, a low-capacity battery including a battery cell in the form of a pack may be used for small portable electronic devices such as cellular phones and camcorders, and a high-capacity battery including a plurality of battery cells connected to one another may be used as a motor-driving power source, such as for electric scooters, hybrid vehicles, or electric vehicles.

Secondary batteries are manufactured in various shapes, such as a cylindrical shape and a prismatic shape. A typical secondary battery is constructed by forming an electrode assembly by disposing an insulating separator between a positive electrode plate and a negative electrode plate, placing the electrode assembly in a case together with electrolyte, and disposing a cap plate on the case. The electrode assembly is connected to electrode terminals which protrude from the cap plate and are exposed to the exterior of the secondary battery.

SUMMARY

According to an aspect of embodiments of the present invention, a secondary battery is configured to prevent or substantially prevent leakage of electrolyte.

According to an embodiment of the present invention, a secondary battery includes: an electrode assembly including a first electrode plate including a first non-coating portion, a second electrode plate including a second non-coating portion, and a separator between the first and second electrode plates; an insulating bag accommodating the electrode assembly and including first and second connection members electrically connected to the first and second non-coating portions, respectively; a case accommodating the electrode assembly and the insulating bag; a cap plate sealing an opening of the case; and first and second electrode terminals electrically connected to the first and second connection members, respectively, and an upper part of the insulating bag having an opening is coupled to a lower surface of the cap plate.

The cap plate may include a safety vent and an electrolyte injection hole at locations corresponding to the opening of the insulating bag.

The insulating bag may include: a fixing part adjacent the opening of the insulating bag and coupled to the lower surface of the cap plate; and a finishing part extending from the fixing part to a location spaced apart from the lower surface of the cap plate.

The first and second connection members may be arranged at locations corresponding to the first and second non-coating portions, respectively, accommodated in the insulating bag. The first and second connection members may be assembled to a side portion of the insulating bag. The first and second connection members may be coupled to a side portion of the insulating bag by thermal pressing.

The first and second connection members may be electrically connected to collecting plates connected to the electrode terminals. The first and second connection members may include protrusions extending outward from a side of the insulating bag, and the protrusions may be connected to the collecting plates.

The first and second non-coating portions may be inserted into inner spaces of the protrusions and electrically connected to the protrusions. Each of the first and second non-coating portions may be formed by placing a plurality of non-coating portions on one another and welding the plurality of non-coating portions together.

The protrusions may include a first protrusion electrically connected to and receiving the first non-coating portion within an inner space of the first protrusion; and a second protrusion electrically connected to and receiving the second non-coating portion within an inner space of the second protrusion. In one embodiment, the secondary battery further includes another electrode assembly accommodated in the case and including a first electrode plate comprising a first non-coating portion, a second electrode plate including a second non-coating portion, and a separator between the first and second electrode plates, and the protrusions include a plurality of first protrusions electrically connected to and receiving the first non-coating portions of the electrode assembly and the another electrode assembly within inner spaces of the first protrusions, and a plurality of second protrusions electrically connected to and receiving the second non-coating portions of the electrode assembly and the another electrode assembly within inner spaces of the second protrusions.

The connection members may include a conductive material selected from the group consisting of aluminum, aluminum alloy, copper, and steel plated with nickel. The connection members may be electrically connected to collecting plates connected to lower ends of the electrode terminals.

The insulating bag may include a material selected from the group consisting of polypropylene (PP) and polyethylene (PE).

The upper part of the insulating bag may be coupled to the lower surface of the cap plate by thermal pressing.

A receiving opening of the insulating bag for receiving the electrode assembly may be sealed by thermal pressing.

BRIEF DESCRIPTION OF THE DRAWINGS

The above and other features and advantages will become more apparent to those of ordinary skill in the art by describing in detail some exemplary embodiments of the present invention with reference to the attached drawings, which are incorporated in and constitute a part of this specification. The drawings illustrate some exemplary embodiments of the present invention and, together with the description, serve to explain principles of the present invention. In the drawings.

DETAILED DESCRIPTION

Figure 1:
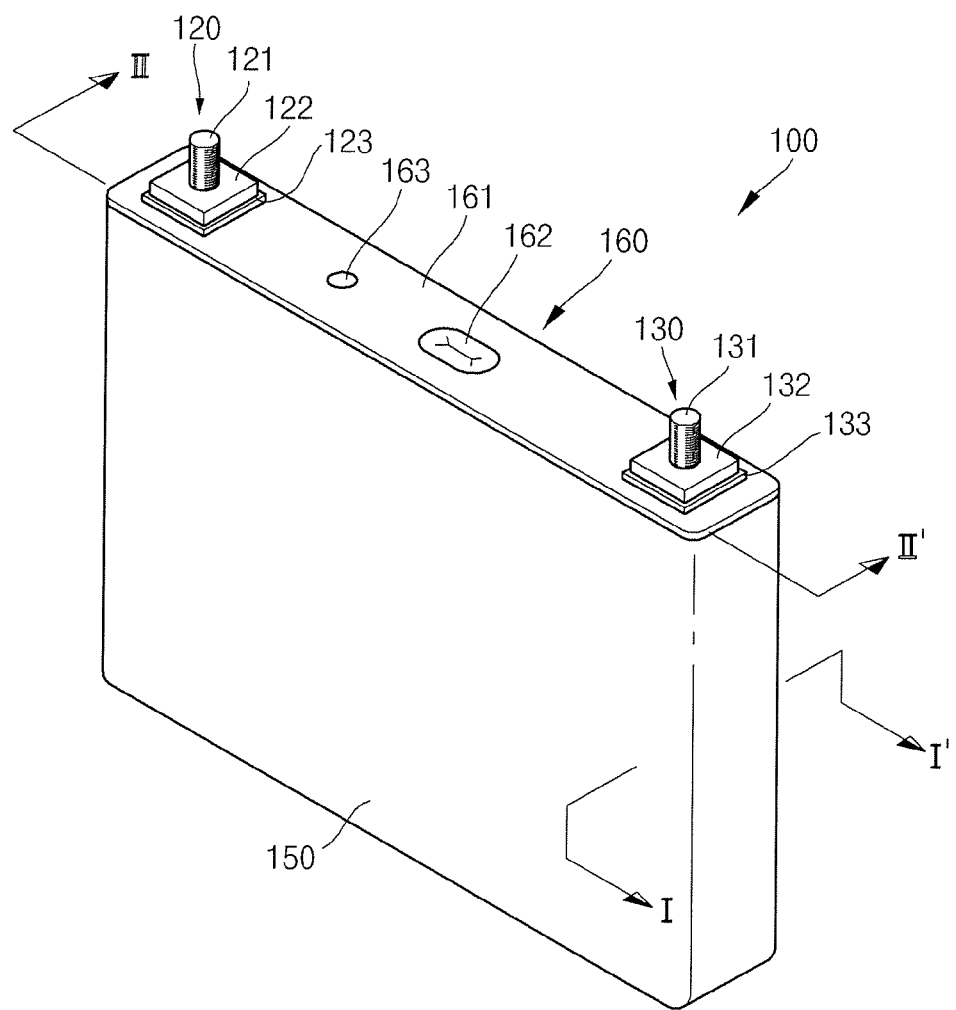
FIG. 1 is a perspective view of a secondary battery according to an embodiment of the present invention.

Some exemplary embodiments will now be described more fully hereinafter with reference to the accompanying drawings; however, embodiments of the present invention may be embodied in different forms and should not be construed as limited to the embodiments set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

In the following description, like reference numerals designate like elements having like functions and operations throughout. In addition, it will be understood that when a part is referred to as being electrically connected to another part, it can be directly connected to the other part, or intervening parts may also be present.

Figure 2:
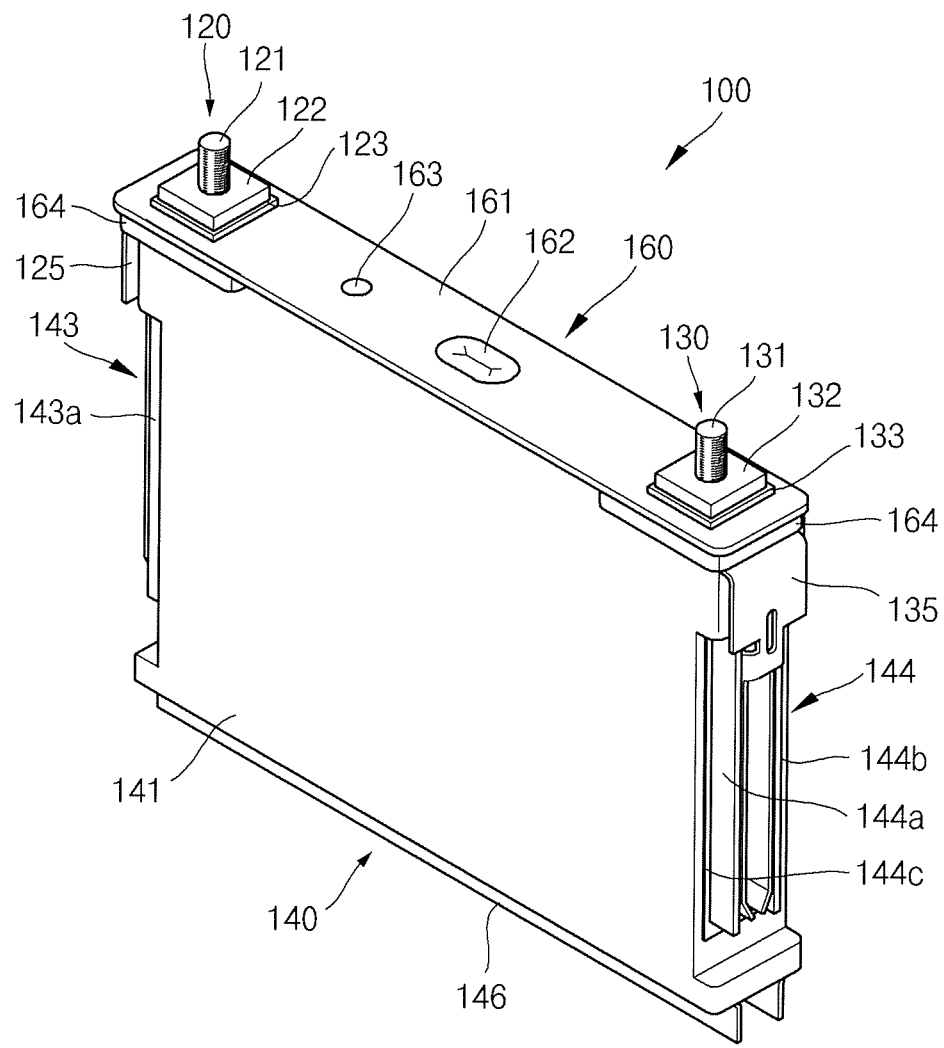
FIG. 2 is a perspective view of the secondary battery of FIG. 1 shown with a case of the secondary battery removed and a lower part of an insulating bag not sealed.
Figure 3:
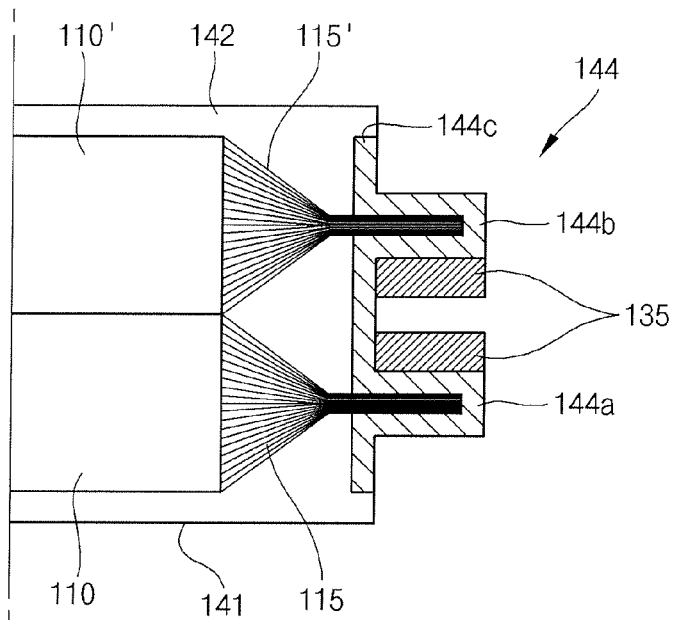
FIG. 3 is a sectional view of the secondary battery of FIG. 1, taken along the line I-I'.
Figure 4:
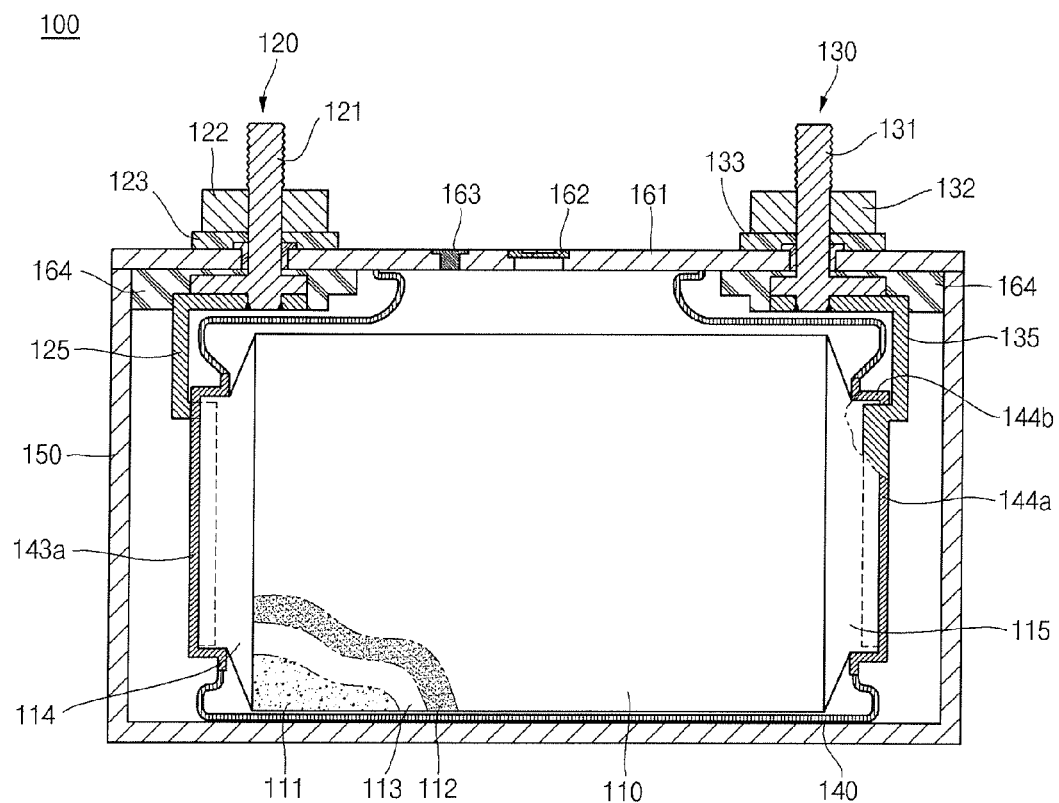
FIG. 4 is a sectional view of the secondary battery of FIG. 1, taken along the line II-II'.
Figure 5:
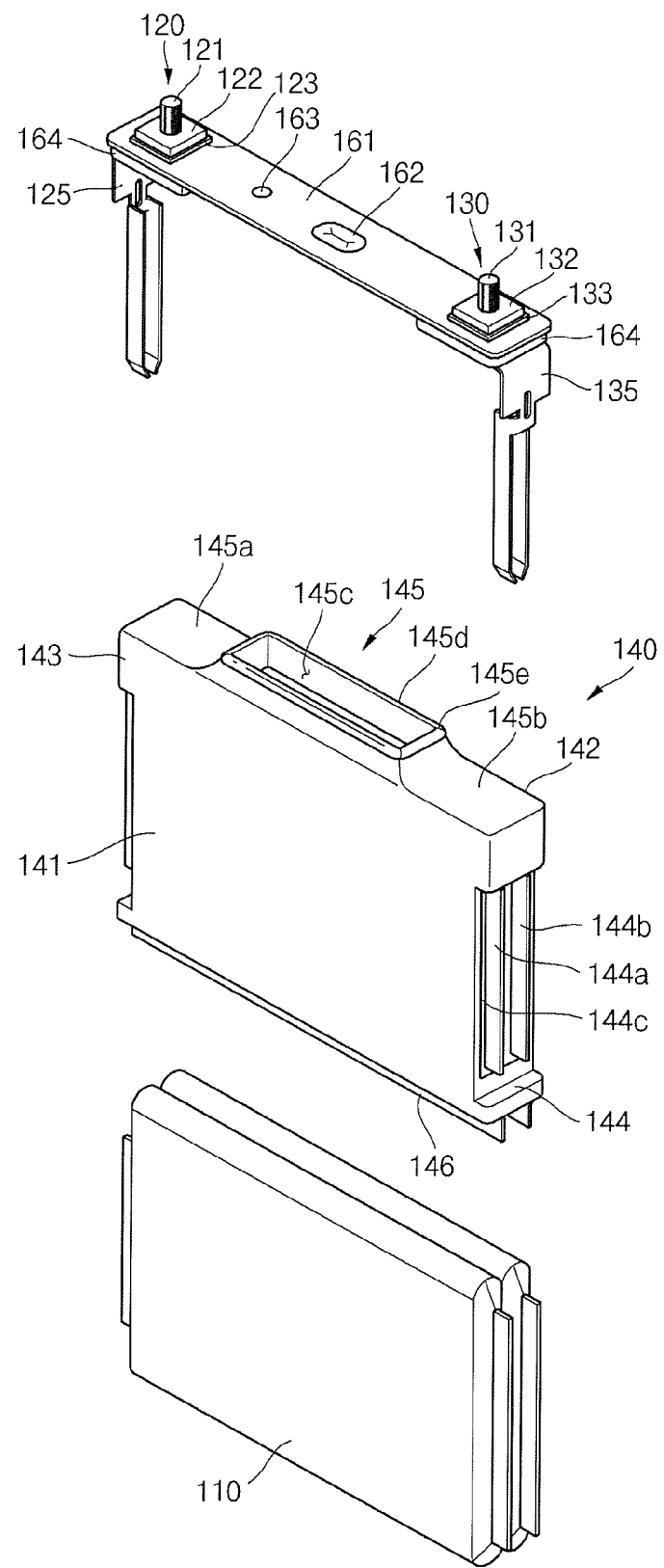
FIG. 5 is an exploded perspective view of the secondary battery of FIG. 2.
Figure 6:
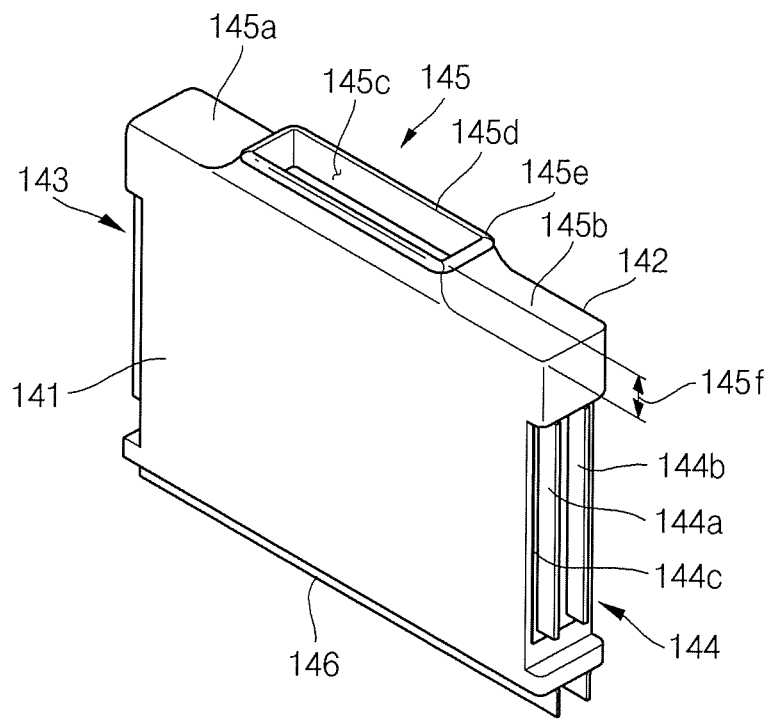
FIG. 6 is a perspective view of the insulating bag of FIG. 2.
Figure 7:
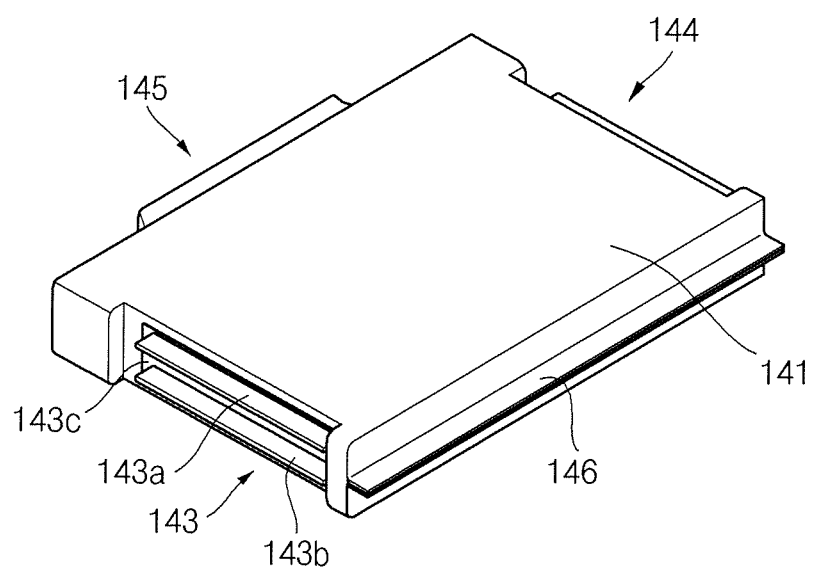
FIG. 7 is a perspective view of the insulating bag of FIG. 6, shown having an electrode assembly inserted therein and the lower part of the insulating bag sealed.
Figure 8:
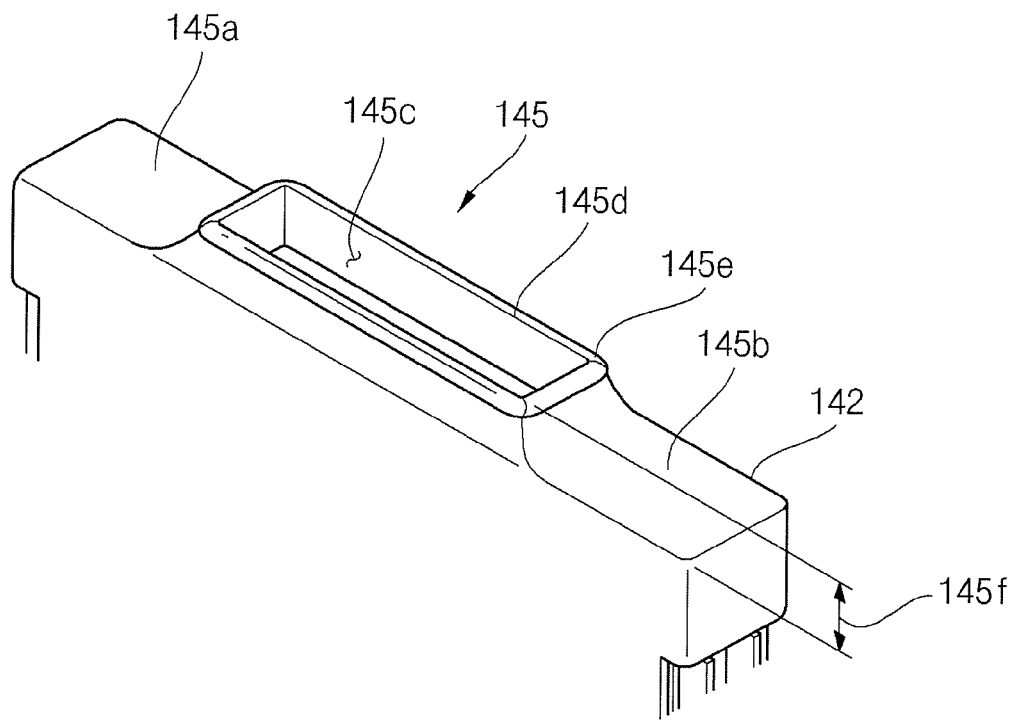
FIG. 8 is a perspective view of an upper part of the insulating bag of FIG. 6.
Figure 9:
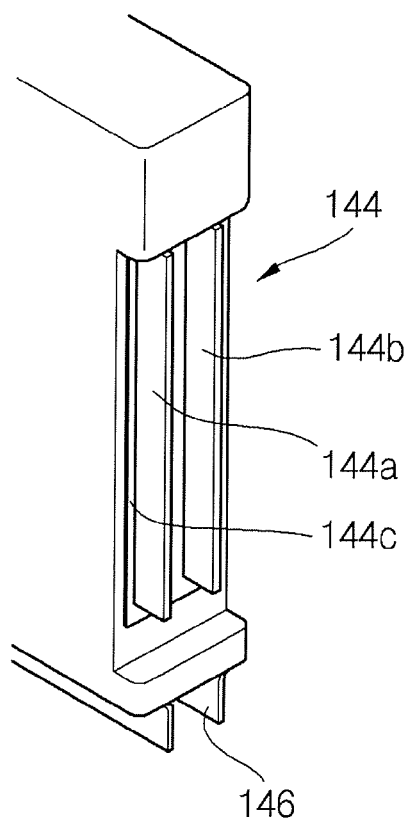
FIG. 9 is a perspective view of a connection member of the insulating bag of FIG. 6.

FIG. 1 is a perspective view illustrating a secondary battery according to an embodiment of the present invention. FIG. 2 is a perspective view showing the secondary battery of FIG. 1 in a state in which a case of the secondary battery is removed from the secondary battery and a lower part of an insulating bag is not sealed. FIG. 3 is a sectional view taken along the line I-I' of FIG. 1. FIG. 4 is a sectional view taken along the line II-II' of FIG. 1. FIG. 5 is an exploded perspective view of the secondary battery shown in FIG. 2. FIG. 6 is a perspective view of the insulating bag of FIG. 2. FIG. 7 is a perspective view of the insulating bag of FIG. 6 shown in a state in which an electrode assembly is inserted in the insulating bag of FIG. 6 and the lower part of the insulating bag is sealed (e.g., by thermal pressing). FIG. 8 is a perspective view of an upper part of the insulating bag of FIG. 6. FIG. 9 is a perspective view of a connection part of the insulating bag of FIG. 6.

Referring to FIGS. 1 through 9, a secondary battery 100 according to an embodiment of the present invention includes an electrode assembly 110, first and second electrode terminals 120 and 130, an insulating bag 140, a case 150, and a cap assembly 160.

The electrode assembly 110 is formed by winding or stacking a first electrode plate 111, a separator 113, and a second electrode plate 112, which have a thin plate or film shape. The first electrode plate 111 may function as a negative electrode, and the second electrode plate 112 may function as a positive electrode. Alternatively, the first electrode plate 111 may function as a positive electrode and the second electrode plate 112 may function as a negative electrode.

The first electrode plate 111 is formed by applying a first electrode active material, such as graphite or carbon, to a first electrode collector formed of a metal foil, such as a copper or nickel foil. However, in embodiments of the present invention, materials which may be used to form the first electrode plate 111 are not limited to the above-mentioned materials but, rather, may include any other suitable materials. The first electrode plate 111 includes a first electrode non-coating portion 114 to which the first electrode active material is not applied. The first electrode non-coating portion 114 functions as a current flow path between the first electrode plate 111 and the outside of the first electrode plate 111.

The second electrode plate 112 is formed by applying a second electrode active material, such as a transition metal oxide, to a second electrode collector formed of a metal foil, such as an aluminum foil. However, in embodiments of the present invention, materials which may be used to form the second electrode plate 112 are not limited to the above-mentioned materials but, rather, may include any other suitable materials. The second electrode plate 112 includes a second electrode non-coating portion 115 to which the second electrode active material is not applied. The second electrode non-coating portion 115 functions as a path for a current between the second electrode plate 112 and the outside of the second electrode plate 112.

The separator 113 is disposed between the first electrode plate 111 and the second electrode plate 112. The separator 113 prevents or substantially prevents a short circuit and allows movement of lithium ions. The separator 113 may be formed of a polyethylene film or a film including polyethylene and polypropylene. However, in embodiments of the present invention, materials which may be used to form the separator 113 are not limited to the above-mentioned materials but, rather, may include any other suitable materials.

The electrode assembly 110 is accommodated in the case 150 together with electrolyte. The electrolyte may include an organic solvent, such as ethylene carbonate (EC), propylene carbonate (PC), diethyl carbonate (DEC), ethyl methyl carbonate (EMC), and/or dimethyl carbonate (DMC), and a lithium salt such as LiPF6 or LiBF4. The electrolyte may be a liquid, a solid, or a gel.

In one embodiment, both ends of the electrode assembly 110 (i.e. the first electrode non-coating portion 114 and the second electrode non-coating portion 115) are respectively coupled with connection members 143$c$ and 144$c$ that are electrically connected to the first and second electrode plates 111 and 112, respectively. The connection members 143$c$, 144$c$ are described later in further detail together with the insulating bag 140.

The connection members 143$c$ and 144$c$ are electrically connected to the first and second electrode terminals 120 and 130, respectively.

The first electrode terminal 120 may be formed of a metal or an equivalent thereof, and is electrically connected to the first electrode plate 111. The first electrode terminal 120, in one embodiment, includes a first terminal column 121, a first terminal plate 122, an upper insulator 123, and a first collecting plate 125.

The first terminal column 121 penetrates a cap plate 161 of the cap assembly 160 and protrudes upward by a length. The first terminal column 121, in one embodiment, is electrically connected to the first collecting plate 125 at a lower side of the cap plate 161. The first terminal column 121 may extend and protrude upward from the cap plate 161 by a predetermined length and may include a flange at a position under the cap plate 161 so that the first terminal column 121 cannot be separated from the cap plate 161.

In one embodiment, a part of the first terminal column 121 below the flange is inserted in a terminal hole of the first collecting plate 125 and is welded to the terminal hole of the first collecting plate 125. A part of the first terminal column 121 above the flange protrudes outward from the cap plate 161. The protruded first terminal column 121 outside the cap plate 161 is fixed to the first terminal plate 122. The first terminal column 121 may be formed of copper, copper alloy, and/or an equivalent thereof, for example. However, in embodiments of the present invention, materials that may be used to form the first terminal column 121 are not limited thereto but, rather, may be formed of any other suitable material.

A penetration hole may be formed through the first terminal plate 122 in a generally vertical direction so that the first terminal column 121 can be coupled to the first terminal plate 122 by inserting the first terminal column 121 through the penetration hole. The first terminal plate 122 may be formed of stainless steel, copper, copper alloy, aluminum, aluminum alloy, and/or an equivalent thereof. However, embodiments of the present invention are not limited to these materials but, rather, may include any other suitable materials. The first terminal plate 122 and the cap plate 161 may be insulated from each other by the upper insulator 123.

The first collecting plate 125 makes contact with the first electrode non-coating portion 114 protruding from the upper part of one side of the electrode assembly 110. In one embodiment, the first collecting plate 125 is welded to the first electrode non-coating portion 114. The first collecting plate 125, in one embodiment, has a generally reverse L-shape, and the terminal hole is formed in the upper part of the first collecting plate 125. The first terminal column 121, in one embodiment, is coupled to the terminal hole by inserting the first terminal column 121 in the terminal hole. In one embodiment, the first collecting plate 125 is formed of copper or a copper alloy. However, the material of the first collecting plate 125 is not limited thereto and, in other embodiments, the first collecting plate may be formed of any other suitable material.

In one embodiment, the first collecting plate 125 is connected to the connection member 143c of the insulating bag 140. Since the first electrode non-coating portion 114 of the electrode assembly 110 is connected to an inner side of the connection member 143c of the insulating bag 140, the first electrode non-coating portion 114 of the electrode assembly 110 is electrically connected to the first collecting plate 125.

In addition, the first collecting plate 125 may have a length corresponding to a length of the first electrode non-coating portion 114.

The second electrode terminal 130 may be formed of a metal or an equivalent thereof, and is electrically connected to the second electrode plate 112. The second electrode terminal 130, in one embodiment, includes a second terminal column 131, a second terminal plate 132, an upper insulator 133, and a second collecting plate 135. The second electrode terminal 130, in one embodiment, has the same or substantially a same shape as that of the first electrode terminal 120. Thus, the shape of the second electrode terminal 130 will not be described further. The second collecting plate 135 and the second terminal column 131 may be formed of aluminum, an aluminum alloy, and/or an equivalent thereof. However, embodiments of the present invention are not limited to these materials but, rather, may include any other suitable materials. The second terminal plate 132 may be formed of stainless steel, aluminum, aluminum alloy, copper, copper alloy, and/or an equivalent thereof. However, the present invention is not limited thereto and, in other embodiments, the second terminal plate 132 may be formed of any other suitable material.

In one embodiment, the second collecting plate 135 is connected to the connection member 144c of the insulating bag 140. Since the second electrode non-coating portion 115 of the electrode assembly 110 is connected to an inner side of the connection member 144c of the insulating bag 140, the second electrode non-coating portion 115 of the electrode assembly 110 is electrically connected to the second collecting plate 135.

In addition, the second collecting plate 135 may have a length corresponding to a length of the second electrode non-coating portion 115.

In one embodiment, the second terminal plate 132 may be electrically connected to the cap plate 161 such that the case 150 and the cap plate 161 may have the same polarity (e.g., positive polarity) as that of the second electrode terminal 130.

The insulating bag 140, in one embodiment, includes an upper part 145, center parts 141, 142, 143, and 144, and a lower part 146.

In one embodiment, the top side of the insulating bag 140 is coupled to the bottom side of the cap plate 161, such as by thermal pressing, so as to prevent or substantially prevent leakage of electrolyte through joints among the first and second electrode terminals 120 and 130, the case 150, and the cap plate 161.

The upper part 145 of the insulating bag 140, in one embodiment, includes finishing parts 145a and 145b, and fixing parts 145d and 145e. An opening 145c is formed in the upper part 145 of the insulating bag 140. The opening 145c is surrounded by the fixing parts 145d and 145e. The insulating bag 140 may be formed of polypropylene (PP) and/or polyethylene (PE). Alternatively, the insulating bag 140 may be formed of any other suitable material.

The fixing parts 145d and 145e, in one embodiment, are fixed to the bottom side of the cap plate 161, such as by thermal pressing. In one embodiment, the position of the opening 145c corresponds to a safety vent 162 and an electrolyte injection hole 163 of the cap plate 161.

The finishing parts 145a and 145b, in one embodiment, extend from the fixing parts 145d and 145e and are lower than the fixing parts 145d and 145e. The finishing parts 145a and 145b may be respectively formed at both sides (i.e. opposite ends) of the opening 145c. Alternatively, the finishing parts 145a and 145b may also be formed at upper and lower sides (i.e. opposite sides between the opposite ends) of the opening 145c. That is, the finishing parts 145a and 145b may be formed in the entire region of the upper part 145 of the insulating bag 140 except for the opening 145c. In one embodiment, the finishing parts 145a and 145b are lower than the fixing parts 145d and 145e by a height difference 145f, and because of the height difference 145f, insulating members 164 can be disposed between the bottom side of the cap plate 161 and the finishing parts 145a and 145b.

The center parts 141, 142, 143, and 144, in one embodiment, correspond to the electrode assembly 110 accommodated in the insulating bag 140. The center parts 141, 142, 143, and 144 may be formed by or include four surfaces as shown in FIG. 6. The insulating bag 140 may have various shapes to accommodate the electrode assembly 110. That is, the shape of the insulating bag 140 is not limited to the generally hexahedral shape shown in FIG. 6.

The center parts 143 and 144 include the connection members 143c and 144c, respectively. The connection members 143c and 144c correspond to the first and second electrode non-coating portions 114 and 115, respectively, of the electrode assembly 110. With reference to FIGS. 2 through 4, the connection member 144c connected to the second electrode terminal 130 is described in further detail below. However, in one embodiment, the connection member 143c connected to the first electrode terminal 120 has the same or a substantially same configuration and, therefore, a description thereof is not repeated herein.

The connection member 144c is disposed at a position corresponding to the second electrode non-coating portion 115 formed on a side of the electrode assembly 110. The connection member 144c, in one embodiment, is coupled to the insulating bag 140, such as by thermal pressing. The connection member 144c connected to the second electrode non-coating portion 115 is described in further detail below.

The connection member 144c, in one embodiment, includes protrusions 144a and 144b extending outward from the insulating bag 140. The protrusions 144a and 144b may have a generally c-shape. According to one embodiment, the second electrode non-coating portion 115 and a second electrode non-coating portion 115' of another electrode assembly 110' are inserted in inner spaces of the protrusions 144a and 144b, respectively. Referring to FIG. 3, the second electrode non-coating portion 115 of the electrode assembly 110 may be inserted in the protrusion 144a. According to one embodiment, as illustrated in FIG. 3, the two electrode assemblies 110 and 110' are provided, and the two protrusions 144a and 144b are provided and receive the respective non-coating portions 115, 115' protruding from sides of the electrode assemblies 110, 110'. However, the number of the protrusions 144a and 144b is not limited to two. For example, in other embodiments of the present invention, a single protrusion may be provided, or more than two protrusions may be provided.

The connection member 144c, in one embodiment, is formed of a conductive metal such as aluminum, aluminum alloy, copper, and/or steel plated with nickel. The second electrode non-coating portion 115 is inserted in the protrusion 144a for electric connection with the protrusion 144a. In one embodiment, the second electrode non-coating portion 115 may be formed by placing a plurality of non-coating portions of the electrode assembly 110 on one another and welding them together, and the welded part may be inserted in the protrusion 144a. In addition, the connection member 144c is electrically connected to the second collecting plate 135, such as at a lower end of the second collecting plate 135.

The lower part 146 of the insulating bag 140 may be open so that the electrode assembly 110 can be inserted into the insulating bag 140. After the electrode assembly 110 is inserted in the insulating bag 140, the open lower part 146 of the insulating bag 140 is closed (e.g., sealed by thermal pressing).

The case 150, in one embodiment, is formed of a conductive metal such as aluminum, aluminum alloy, and/or steel plated with nickel. The case 150, in one embodiment, has a generally hexahedral shape with an opening so that the electrode assembly 110, the first electrode terminal 120, the second electrode terminal 130, and the insulating bag 140 can be inserted and placed in the case 150. The secondary battery 100 is sealed by coupling the cap assembly 160 to the opening of the case 150. The inner surface of the case 150, in one embodiment, is treated to be electrically insulated from the electrode assembly 110, the first electrode terminal 120, the second electrode terminal 130, and the cap assembly 160.

The cap assembly 160, in one embodiment, includes the cap plate 161, the safety vent 162, and the electrolyte injection hole 163.

The cap plate 161 seals the case 150. The cap plate 161 includes a hole for insertion of the first electrode terminal 120 connected to the first collecting plate 125 through the cap plate 161. In addition, the cap plate 161 includes another hole for insertion of the second electrode terminal 130 connected to the second collecting plate 135 through the cap plate 161. In one embodiment, the first and second electrode terminals 120 and 130 are insulated from the cap plate 161 by gaskets. The first and second electrode terminals 120 and 130 may be threaded and include nuts (not shown) so that the first and second electrode terminals 120 and 130 can be fixed to the cap plate 161 by tightening the nuts on the first and second electrode terminals 120 and 130. After electrolyte is injected through the electrolyte injection hole 163 of the cap plate 161, the electrolyte injection hole 163 is closed with a plug (not shown). The cap plate 161 may include the safety vent 162. The safety vent 162, in one embodiment, has a thin thickness so that, if pressure increases to a set value, the safety vent 162 may be broken to release gas.

The insulating members 164 are disposed on the bottom side of the cap plate 161. The insulating members 164 prevent or substantially prevent a short circuit between the cap plate 161 and the first and second electrode terminals 120 and 130. For example, the insulating members 164 prevent or substantially prevent a short circuit between the first collecting plate 125 and the cap plate 161. The insulation members 164 may be formed of polyphenylene sulfide (PPS), for example. However, the present invention is not limited thereto and, in other embodiment, the insulation members 164 may be formed of any other suitable material.

The safety vent 162 and the electrolyte injection hole 163 of the cap plate 161 are located at positions corresponding to the opening 145c of the insulating bag 140. Electrolyte injected through the electrolyte injection hole 163 is filled in the insulating bag 140. This prevents or substantially prevents leakage of the electrolyte through joints among the first and second electrode terminals 120 and 130, the cap plate 161, and the case 150.

As described above, according to embodiments of the present invention, since the secondary battery includes the insulating bag in the case, leakage of electrolyte can be prevented or substantially prevented.

Furthermore, in the secondary battery according to embodiments of the present invention, the electrode assembly is accommodated in the insulating bag, and the upper part of the insulating bag is coupled to the bottom of the cap plate, such as by thermal pressing, thereby preventing or substantially preventing leakage of electrolyte through welded parts among the electrode terminals, the cap plate, and the case.

Furthermore, in the secondary battery according to embodiments of the present invention, the connection members are disposed at the insulating bag and are electrically connected to the collecting plates. Therefore, the secondary battery can be easily assembled.

Some exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
   an electrode assembly comprising a first electrode plate comprising a first non-coating portion, a second electrode plate comprising a second non-coating portion, and a separator between the first and second electrode plates;
   an insulating bag accommodating the electrode assembly and comprising first and second connection members electrically connected to the first and second non-coating portions, respectively;
   a case accommodating the electrode assembly and the insulating bag;
   a cap plate sealing an opening of the case; and
   first and second electrode terminals electrically connected to the first and second connection members, respectively, wherein an upper part of the insulating bag comprises one or more fixing parts surrounding an opening of the insulating bag, the one or more fixing parts being fixed to a lower surface of the cap plate to seal an electrolyte in the insulating bag.

2. The secondary battery as claimed in claim 1, wherein the cap plate comprises a safety vent and an electrolyte injection hole at locations corresponding to the opening of the insulating bag.

3. The secondary battery as claimed in claim 2, wherein the insulating bag further comprises:
a finishing part extending from a fixing part of the one or more fixing parts to a location spaced apart from the lower surface of the cap plate.

4. The secondary battery as claimed in claim 1, wherein the first and second connection members are arranged at locations corresponding to the first and second non-coating portions, respectively, accommodated in the insulating bag.

5. The secondary battery as claimed in claim 1, wherein the first and second connection members are assembled to a side portion of the insulating bag.

6. The secondary battery as claimed in claim 1, wherein the first and second connection members are coupled to a side portion of the insulating bag by thermal pressing.

7. The secondary battery as claimed in claim 1, wherein the first and second connection members are electrically connected to collecting plates connected to the electrode terminals.

8. The secondary battery as claimed in claim 7, wherein the first and second connection members comprise protrusions extending outward from a side of the insulating bag, and the protrusions are connected to the collecting plates.

9. The secondary battery as claimed in claim 8, wherein the first and second non-coating portions are inserted into inner spaces of the protrusions and electrically connected to the protrusions.

10. The secondary battery as claimed in claim 9, wherein each of the first and second non-coating portions is formed by placing a plurality of non-coating portions on one another and welding the plurality of non-coating portions together.

11. The secondary battery as claimed in claim 9, wherein the protrusions comprise:
a first protrusion electrically connected to and receiving the first non-coating portion within an inner space of the first protrusion; and
a second protrusion electrically connected to and receiving the second non-coating portion within an inner space of the second protrusion.

12. The secondary battery as claimed in claim 9, further comprising another electrode assembly accommodated in the case and comprising a first electrode plate comprising a first non-coating portion, a second electrode plate comprising a second non-coating portion, and a separator between the first and second electrode plates, wherein the protrusions comprise:
a plurality of first protrusions electrically connected to and receiving the first non-coating portions of the electrode assembly and the another electrode assembly within inner spaces of the first protrusions; and
a plurality of second protrusions electrically connected to and receiving the second non-coating portions of the electrode assembly and the another electrode assembly within inner spaces of the second protrusions.

13. The secondary battery as claimed in claim 1, wherein the first and second connection members comprise a conductive material selected from the group consisting of aluminum, aluminum alloy, copper, and steel plated with nickel.

14. The secondary battery as claimed in claim 1, wherein the insulating bag comprises a material selected from the group consisting of polypropylene and polyethylene.

15. The secondary battery as claimed in claim 1, wherein the upper part of the insulating bag is coupled to the lower surface of the cap plate by thermal pressing.

16. The secondary battery as claimed in claim 1, wherein a receiving opening of the insulating bag for receiving the electrode assembly is sealed by thermal pressing.

* * * * *